(12) United States Patent
Kang et al.

(10) Patent No.: US 8,506,682 B2
(45) Date of Patent: Aug. 13, 2013

(54) PROCESS FOR PURIFICATION OF MONOSILANE

(75) Inventors: Kyoung Hoon Kang, Gyeonggi-do (KR); Yoon Jun Kim, Gyeonggi-do (KR); Kyong Bok Hur, Incheon (KR); Moon Gue Jun, Gyeonggi-do (KR)

(73) Assignee: KCC Corporation, Seoul (KR)

( * ) Notice: Subject to any disclaimer, the term of this patent is extended or adjusted under 35 U.S.C. 154(b) by 269 days.

(21) Appl. No.: 13/055,108

(22) PCT Filed: Nov. 8, 2010

(86) PCT No.: PCT/KR2010/007838
§ 371 (c)(1),
(2), (4) Date: Jan. 20, 2011

(87) PCT Pub. No.: WO2011/059210
PCT Pub. Date: May 19, 2011

(65) Prior Publication Data
US 2011/0189073 A1    Aug. 4, 2011

(30) Foreign Application Priority Data

Nov. 16, 2009   (KR) .................. 10-2009-0110518

(51) Int. Cl.
*B01D 53/02*        (2006.01)
(52) U.S. Cl.
USPC .............. 95/144; 95/901; 96/108; 502/416; 423/324
(58) Field of Classification Search
None
See application file for complete search history.

(56) References Cited

U.S. PATENT DOCUMENTS

| | | | | |
|---|---|---|---|---|
| 4,542,005 A * | 9/1985 | Tetsuya et al. | ................ | 423/347 |
| 4,632,816 A * | 12/1986 | Marlett | .................. | 423/347 |
| 4,676,967 A * | 6/1987 | Breneman | .................. | 423/347 |
| 4,757,154 A * | 7/1988 | Marlett et al. | ................ | 556/176 |
| 5,211,931 A * | 5/1993 | Allen et al. | .................. | 423/347 |
| 5,290,342 A * | 3/1994 | Wikman et al. | .................. | 95/143 |
| 5,446,005 A * | 8/1995 | Endo | ............................ | 502/433 |
| 5,499,506 A * | 3/1996 | Nagamura et al. | ............. | 62/620 |
| 6,103,942 A * | 8/2000 | Tsuo et al. | .................. | 568/888 |
| 2004/0184980 A1 | 9/2004 | Atobe et al. | | |
| 2009/0155156 A1* | 6/2009 | Sonnenschein et al. | ...... | 423/343 |
| 2009/0274936 A1* | 11/2009 | Goldstein et al. | ............. | 429/13 |

FOREIGN PATENT DOCUMENTS

EP     811815 B1 *  8/2002
JP     62-070217 A   3/1987

OTHER PUBLICATIONS

International Search Report prepared by the Korean Intellectual Property Office as International Searching Authority for PCT International Patent Application No. PCT/KR2010/007838, mailed Aug. 1, 2011, 3 pages.

\* cited by examiner

*Primary Examiner* — Duane Smith
*Assistant Examiner* — Phillip Shao
(74) *Attorney, Agent, or Firm* — Swanson & Bratschun, LLC

(57) ABSTRACT

Provided is a method of purifying monosilane. More particularly, the method includes removing impurities from a crude material containing monosilane and ethylene by fractional distillation (operation 1), and removing ethylene and residual impurities by passing the crude material purified in operation 1 through activated carbon (operation 2). According to the method, high-purity monosilane may be more simply and effectively obtained without additional production of byproducts by selectively adsorbing ethylene, which is difficult to separate by fractional distillation, using an activated carbon.

8 Claims, 1 Drawing Sheet

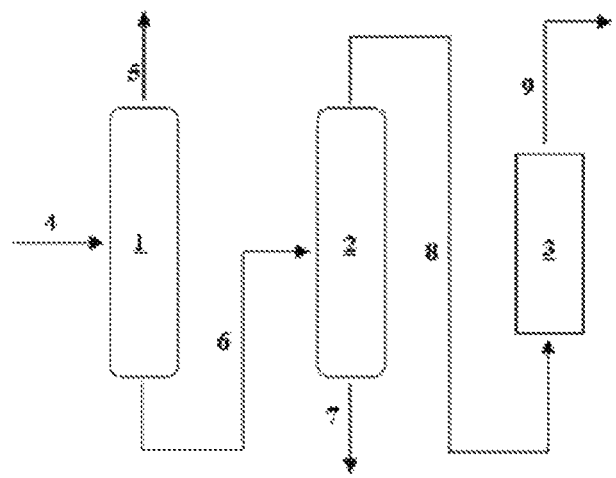
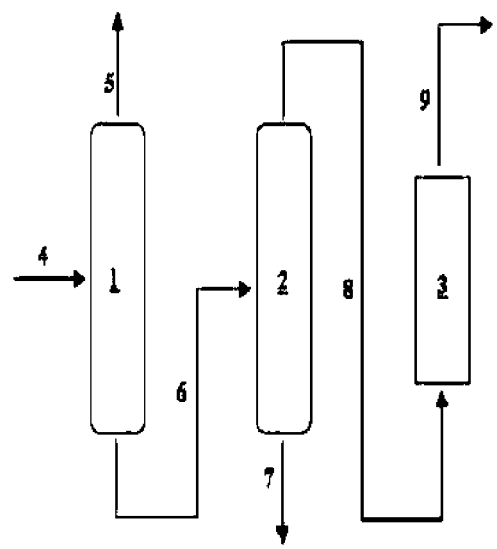

PROCESS FOR PURIFICATION OF MONOSILANE

CROSS-REFERENCE TO RELATED APPLICATION

This application claims priority to and the benefit of Korean Patent Application No. 2009-0110518, filed Nov. 16, 2009, the disclosure of which is incorporated herein by reference in its entirety.

BACKGROUND

1. Field of the Invention

The present invention relates to a method of purifying monosilane.

2. Discussion of Related Art

Monosilane ($SiH_4$) is a gas-phase compound which has been widely used in various applications such as semiconductors, photovoltaic cells, and thin film transistors (TFTs) for liquid crystal displays (LCDs). Recently, due to demands for greater integration and performance of electronic parts, the purity of monosilane has been considered very important.

For this reason, development of a method for yielding high-purity silicon in which the carbon content does not exceed 100 ppb while boron, arsenic, phosphorus and other electrical active compounds are present in a content less than 1 ppb, is demanded.

Usually, monosilane is prepared by diproportionating silane chlorides or by reacting a metal hydride with halogenated silane. In this process, a large amount of impurities including ethylene are produced.

In addition to ethylene, the impurities may include heavyweight impurities such as ethane, ethyl silane and diethyl silane, which are generally able to be distilled at a higher boiling point than monosilane; lightweight impurities such as methane or hydrogen, which are able to be distilled at a lower boiling point than monosilane; inorganic impurities such as boron, phosphorus and arsenic, etc.

Among the various impurities, most impurities except for ethylene may be relatively easily removed by fractional distillation. The remaining ethylene is difficult to remove by fractional distillation because it has a similar boiling point to the monosilane. Therefore, the remaining ethylene in the monosilane serves as a carbon impurity in subsequent applications thereby reducing the purity of purified monosilane.

U.S. Pat. No. 4,554,141 discloses a method of removing ethylene from monosilane, in which ethylene is removed from a gas including monosilane.

In U.S. Pat. No. 4,554,141, crystalline aluminosilicate is used as a zeolite. The porous zeolite can be used to selectively remove ethylene from monosilane, as it has excellent adsorption to the ethylene, and can be easily reused.

More particularly, U.S. Pat. No. 4,554,141 discloses a process including preferentially distilling monosilane to remove hydrocarbon compounds, passing a stream of monosilane gas through a zeolite to selectively remove ethylene, and isolating the purified monosilane.

However, according to the method of purifying monosilane, some ethylene is converted into ethyl silane while the monosilane gas passes through the zeolite. Therefore, the ethyl silane may serve as another carbon impurity, and additional purification process for ethyl silane is required.

SUMMARY OF THE INVENTION

The present invention is directed to a method of purifying monosilane, which is able to effectively remove impurities such as ethylene from monosilane gas without additional production of byproducts all the while using a simpler process.

One aspect of the present invention is to provide a method of purifying monosilane, comprising a process removing ethylene and the residual impurities by passing a crude material containing monosilane and ethylene through activated carbon.

BRIEF DESCRIPTION OF THE DRAWINGS

Features and advantages of the present invention will become more apparent to those of ordinary skill in the art by describing in detail exemplary embodiments thereof with reference to the accompanying drawings in which:

FIG. 1 is a schematic process flow diagram illustrating a method of purifying monosilane according to an exemplary embodiment of the present invention.

DESCRIPTION OF THE IMPORTANT SIGNS OF THE DRAWINGS

| | |
|---|---|
| 1, 2: Distillation Column | 3: An Adsorption Tower |
| 4: Material | 5: Lightweight Impurities |
| 6: The Crude Material Primarily Purified | 7: Heavyweight Impurities |
| 8.: The Crude Material Purified in the Distillation | 9: The Residual Impurities |

DETAILED DESCRIPTION OF EXEMPLARY EMBODIMENTS

Hereinafter, the present invention will be described in detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification. In the drawings, the thickness of layers and regions are exaggerated for clarity.

The present invention relates to a method of purifying monosilane, including a process removing ethylene and the residual impurities by passing a crude material containing monosilane and ethylene through activated carbon.

Hereinafter, the method of purifying monosilane according to an exemplary embodiment of the present invention will be described.

As described above, the method of purifying monosilane according to the exemplary embodiment of the present invention includes a process removing ethylene and the residual impurities by passing a crude material containing monosilane and ethylene through activated carbon having a pore diameter of 0.4 to 0.7 nm.

The crude material containing monosilane and ethylene is a monosilane compound prepared by various reactions known in the art. However, any of the crude materials containing monosilane and ethylene may be used without particular limitation although they are prepared by different reactions.

The crude material containing monosilane and ethylene may include a first crude material prepared by a reaction between metal hydride and halogenated silicon, and a second crude material prepared by diproportionation of the halogenated silicon.

For example, the first crude material may be prepared by reacting metal hydride selected from the group consisting of sodium hydride (NaH), calcium hydride (CaH$_2$) and sodium aluminum hydride (NaAlH$_4$) with halogenated silicon selected from the group consisting of silicon tetrachloride (SiCl$_4$) and silicon tetrafluoride (SiF$_4$).

In detail, monosilane may be prepared by reacting sodium aluminum hydride and silicon tetrafluoride. Such reaction is represented by the following Scheme 1:

[Scheme 1]

Meanwhile, the second crude material may be prepared by diproportionation of silane chloride selected from the group consisting of monochlorosilane (SiH$_3$Cl), dichlorosilane (SiH$_2$Cl$_2$), trichlorosilane (SiHCl$_3$) and tetrachlorosilicon (SiCl$_4$).

Usually, when monosilane is prepared by the above-mentioned reactions, the prepared crude material contains various impurities such as lightweight impurities, heavyweight impurities, ethylene and inorganic impurities in addition to monosilane.

The term "lightweight impurities" used herein refers to impurities contained in the crude material as described above, and includes organic materials having a lower boiling point than the target material, monosilane, such as hydrogen, nitrogen and methane.

The term "heavyweight impurities" used herein refers to impurities contained in the crude material, and includes organic materials having a higher boiling point than the target material, monosilane, such as ethane, ethyl silane, dimethoxyethane (DME) and toluene.

In addition to the heavyweight and lightweight impurities, the inorganic impurities such as boron or phosphorus may be also contained in the crude material.

As described above, the crude material containing monosilane and ethylene may contain various impurities in addition to the monosilane and ethylene, and the crude material containing monosilane and ethylene used herein may be purified by removing the above-mentioned impurities by fractional distillation.

More particularly, the crude material containing monosilane and ethylene may be purified by fractional distillation, including: (1) removing the lightweight impurities having lower boiling points than monosilane; and (2) removing the heavyweight impurities having higher boiling points than monosilane from the crude material purified in operation (1).

Here, operation (1) serves to remove the lightweight impurities having lower boiling points than monosilane, but the present invention is not particularly limited to the processing conditions for operation (1). In operation (1), for example, the lightweight impurities may be removed by passing the crude material through a distillation column at a temperature of −50 to −20° C. and a pressure of 300 to 350 psig.

After the lightweight impurities are removed in operation (1), the heavyweight impurities having a higher boiling point than monosilane may be removed in operation (2).

The present invention is not particularly limited to the processing conditions for operation (2), but, in operation (2), the heavyweight impurities may be removed by passing the crude material primarily purified in operation (1) through another distillation column at a temperature of −40 to −30° C. and a pressure of 200 to 300 psig.

Here, the present invention is not particularly limited to the kind of distillation column, and thus known columns used in methods of purifying various crude materials including silane may be used without limitation. For example, a column filled with Flexipac filler may be used, but the present invention is not limited thereto.

According to the present invention, to further improve efficiency in removing the impurities, a process of compressing the crude material at a predetermined pressure may be further performed before the crude material is injected into the distillation column.

Here, a means for compressing the crude material may be, but is not particularly limited to, a conventional compressor and a pressure that has been appropriately selected in consideration of the crude material or processing conditions used in the process, but the present invention is not particularly limited thereto. For example, the crude material may be compressed under a pressure of approximately 300 to 400 psig, preferably approximately 350 psig.

Meanwhile, in the present invention, the ethylene and residual impurities may be removed from the above-mentioned crude material containing monosilane and ethylene using activated carbon.

That is to say, the ethylene and residual impurities may be removed by passing the crude material containing monosilane and ethylene through an adsorption tower filled with activated carbon.

The kind of activated carbon used herein is used without particular limitation and thus may include any one of which may selectively adsorb ethylene. For example, the activated carbon has a plurality of pores, each of which has a specific surface area of 200 to 500 m$^2$/g, and preferably 250 to 400 m$^2$/g.

When the specific surface area of the activated carbon is less than 200 m$^2$/g, the activated carbon may have a low adsorption ability, which leads to a short recycling or exchanging period. When the specific surface area of the activated carbon exceeds 500 m$^2$/g, the activated carbon may have a decreased adsorbing ability because it is difficult for a material being adsorbed to penetrate into the activated carbon due to an increasingly dense distribution of micropores.

Here, the specific surface area may be a value measured using a measurement method known in the art, for example, the Brunauer-Emmett-Teller (BET) method, but the present invention is not limited thereto.

The activated carbon may have a total pore volume of 0.05 to 1 cm$^3$/g, preferably 0.1 to 0.3 cm$^3$/g.

The term "total pore volume" used herein refers to a total volume of pores formed in 1 g of activated carbon. If the total pore volume is out of the numerical limit, it is difficult for the activated carbon to selectively absorb ethylene.

The activated carbon has uniformly distributed pores having various pore diameters. The pore diameter of the activated carbon used herein may be 0.4 to 0.7 nm, particularly 0.4 to 0.5 nm.

If the pore diameter of the activated carbon exceeds the limited range, it is difficult for the activated carbon to selectively adsorb ethylene.

Furthermore, the activated carbon used in the method of purifying monosilane according to the present invention may be an activated carbon whose specific surface area, total pore volume and pore diameter meet the numerical limits as described above.

Such activated carbon may selectively adsorb ethylene and other residual impurities to the insides of the pores more effectively. However, monosilane may passes through the adsorption tower without adsorption to the pores.

In addition, the removal of ethylene and residual impurities may be performed under the processing conditions, for example, a temperature of −80 to 100° C. and a pressure of −30 to 150 psig, particularly; a temperature of −40 to 50° C. and a pressure of 0 to 100 psig, but the present invention is not particularly limited in processing conditions.

As described above, when the crude material containing monosilane and ethylene is purified by the method of purifying monosilane according to the present invention, the impurities including ethylene may be effectively removed without additional production of byproducts.

When the impurities including ethylene are removed according to the method of purifying monosilane described by the present invention, the efficiency in removing the impurities, for example, ethylene, may be 1 ppm or less; and preferably 0.02 ppm or less, which is lower than the detection limit However, the present invention is not limited thereto.

When an amount of ethylene contained in monosilane purified by the method of purifying monosilane is more than 1 ppm, the ethylene may serve as a carbon impurity, which leads to a considerable decrease in the purity of the monosilane.

According to the present invention, since the processing conditions do not necessarily run to extremes, the purification process may be performed more stably and economically.

The purification method of the present invention will be schematically described with respect to the accompanying drawing. However, it should be understood that examples described below are merely provided to describe the method of purifying monosilane according to the present invention in detail, not to limit the present invention.

Referring to FIG. 1, a crude material (4) containing lightweight impurities, heavyweight impurities, ethylene and inorganic impurities in addition to monosilane may be injected into a distillation column (1) under conditions including a temperature of −50 to −20° C. and a pressure of 300 to 350 psig, and the lightweight impurities (5) may be removed through the column (1).

Subsequently, the crude material (6) purified in the distillation column (1) may be injected into a distillation column (2) under conditions including a temperature of −40 to −30° C. and a pressure of 200 to 300 psig, and the heavyweight impurities (7) may be removed from the column (2).

Subsequently, the crude material (8) purified in the distillation column (2) may be injected into an adsorption tower (3), and residual impurities (9) including ethylene and inorganic impurities (e.g., phosphorus) remaining in the adsorption tower (3) are removed, thereby finally extracting a high-purity target compound.

EXAMPLES

Hereinafter, the present invention will be described in further detail with respect to examples according to the present invention and comparative examples not according to the present invention; however, the scope of the present invention is not limited to the following examples.

Preparation Example 1

After 5 g of sodium aluminum hydride (SAH) was dissolved in 195 g of bis(2-methoxyethyl)ether (diglyme) in a round-bottom flask, silicon tetrafluoride ($SiF_4$) gas was injected at 24 ml/min under a pressure of 0 to 20 psig at a temperature of 30 to 60° C.

The monosilane prepared thus was analyzed by gas chromatography (PerkinElmer, Clarus 600), with a 5 wt % of lightweight impurities (hydrogen, nitrogen and methane, etc.) and a 1 wt % of heavyweight impurities (ethane, ethylene, ethyl silane, diethyl silane, diglyme and toluene, etc.).

Example 1

The crude material containing monosilane prepared in Example 1 was continuously injected into a first purification tower, and the lightweight impurities were isolated and removed at a temperature of −34° C. under a pressure of 315 psig.

Subsequently, the monosilane passing through the first purification tower and a hydrocarbon having a high boiling point were injected into a second purification tower, and the heavyweight impurities were isolated and removed at a temperature of −37° C. under a pressure of 280 psig. It was analyzed that approximately 0.007 mol % ethylene [using single component conversion through the analysis with gas chromatography (Perkin-Elmer Clarus 600)] was present in the monosilane-containing crude material gas purified by the above method.

The gaseous crude material containing monosilane and ethylene subjected to the purification process was continuously injected into a U-tube reactor filled with activated carbon.

Here, the U-tube reactor used in this experiment was manufactured of stainless steel (SS-316), and it was washed with 8% nitric acid ($HNO_3$) solution and dried in a vacuum oven. Afterwards, it was subjected to a leak test with a compression of helium (He).

The activated carbon filled in the U-tube reactor had a specific surface area of 300 $m^2$/g, a total pore volume of 0.13 ml/g, and a pore diameter of 0.4 to 0.5 nm. That is to say, the above-mentioned activated carbon was filled with a content of 10 g in the U-tube reactor, and then subjected to a pre-treatment process.

First, Helium was flowed at 150 to 160° C. for 6 hours and a vacuum level was maintained at $10^{-3}$ torr for at least 1 hour using a rotary vane pump while the temperature was maintained. Helium was flowed again, and the temperature was decreased to room temperature.

The purified gaseous crude material containing monosilane and ethylene was passed through an activated carbon layer which was subjected to the above-mentioned pre-treatment at a flow rate of 20 ml/min under conditions including a temperature of 25° C. and a pressure of 0.5 psig to perform an adsorption reaction.

Example 2

The process of purifying monosilane prepared in Preparation Example 1 was performed under the same conditions as Example 1, except that the reaction temperature and pressure of the U-tube reactor of Example 1 were maintained at 80° C. and 0.5 psig, respectively.

Example 3

Instead of the crude material containing monosilane prepared in Preparation Example 1, a gas mixture of monosilane and ethylene was prepared with various concentrations of monosilane (purity of 99.9999%) and ethylene (purity of 99.5%) in a high pressure cylinder container using a mass flow controller (MFC).

Subsequently, the purification of monosilane was performed under the same conditions as in Example 1, except that the gas mixture was purified in the same manner as described in Example 1 in order to adjust the concentration of ethylene to approximately 34 mol %. The gas source containing monosilane and ethylene subjected to the purification process was passed through a U-tube reactor filled with activated carbon at a flow rate of 30 ml/min to perform an adsorption reaction.

Example 4

The purification of monosilane was performed under the same conditions as in Example 3, except that the activated carbon filled in the U-tube reactor of Example 3 had a pore diameter of 0.5 to 0.7 nm.

Comparative Example 1

The purification of monosilane was performed under the same conditions as in Example 3, except that the U-tube reactor of Example 3 was filled with 10 g of zeolite 4 A (8 to 12 meshes), instead of the activated carbon.

Comparative Example 2

The purification of monosilane was performed under the same conditions as in Example 3, except that the activated carbon filled in the U-tube reactor of Example 3 had a pore diameter of 0.3 to less than 0.4 nm.

Comparative Example 3

The purification of monosilane was performed under the same conditions as in Example 3, except that the activated carbon filled in the U-tube reactor of Example 3 had a pore diameter of more than 0.7 to 2.0 nm.

Experimental Example 1

Off-gas composition was analyzed in real time using gas chromatography (GC; Perkin-Elmer Clarus 600) provided with a thermal conductivity detector (TCD) and a pulsed discharge detector (PDD), and a compound newly produced in a U-tube reactor was assessed by mass spectrometry (MS) through a sampling port connected to the U-tube reactor.

TABLE 1

| | Filler | Pore Diameter (nm) | Before Purification (mol %) Ethylene | After Purification (mol %) Ethylene | After Purification (mol %) Ethyl Silane |
|---|---|---|---|---|---|
| Example 1 | Activated carbon | 0.4 to 0.5 | 0.007 | — | — |
| Example 2 | Activated carbon | 0.4 to 0.5 | 0.007 | — | — |
| Example 3 | Activated carbon | 0.4 to 0.5 | 34 | — | — |
| Example 4 | Activated carbon | 0.5 to 0.7 | 34 | 0.00004 | — |
| Comparative Example 1 | Zeolite | 0.4 | 34 | 10.35 | 0.02 |
| Comparative Example 2 | Activated carbon | 0.3 to less than 0.4 | 34 | 34 | — |
| Comparative Example 3 | Activated carbon | More than 0.7 to 2.0 | 34 | — | — |

[a] The analysis was performed using single component conversion by GC (Perkin-Elmer Claus 600) before activated carbon was saturated.
*Comparative Example 3: No monosilane was detected after purification.

Referring to Table 1, it can be seen that ethylene was completely removed from the monosilane gas purified in Examples 1 to 4 by the present invention method without additional production of byproducts, or only 0.00004 mol % of ethylene was present in the monosilane gas.

On the other hand, in Comparative Example 1, an additional byproduct, ethyl silane, was not only detected, but also 10.35 mol % of ethylene was present in the final purified monosilane gas.

In Comparative Example 2 using the activated carbon having a pore diameter of less than 0.4 nm, no ethylene was purified at all, and in Comparative Example 3 using the activated carbon having a pore diameter of more than 0.7 nm, neither ethylene nor monosilane was detected because they were all adsorbed. Therefore, it was concluded that when the activated carbon is out of the pore diameter limit, it is very difficult to selectively adsorb ethylene.

According to the method of purifying monosilane of the present invention, the high-purity target compound can be obtained by more simply and easily removing the impurities, which are difficult to separate from monosilane, such as ethylene. Furthermore, according to the purification method of the present invention, no additional byproducts such as ethyl silane are produced during the removal of ethylene. Therefore, a separate removal of such a byproduct is not required, and the target compound may have high adsorption under a low pressure and moderate conditions, thus the process can be operated more economically.

While the invention has been shown and described with reference to certain exemplary embodiments thereof, it will be understood by those skilled in the art that various modifications and changes in form and details may be made therein without departing from the scope of the invention as defined by the appended claims.

The invention claimed is:

1. A method of purifying monosilane, comprising passing a crude material containing monosilane and ethylene through activated carbon having a pore diameter of 0.4 to 0.7 nm, a specific surface area of 250 to 400 $m^2/g$ and a total pore volume of 0.1 to 0.3 $cm^3/g$ to remove ethylene and residual impurities, wherein the crude material contains more than 1 ppm ethylene.

2. The method according to claim 1, wherein the crude material containing monosilane and ethylene is a first crude material prepared by a reaction between a metal hydride and a halogenated silicon; or a second crude material prepared by diproportionation of the halogenated silicon.

3. The method according to claim 2, wherein the first crude material is prepared by reacting a metal hydride selected from the group consisting of sodium hydride, calcium hydride and sodium aluminum hydride with a halogenated silicon selected from the group consisting of silicon tetrachloride and silicon tetrafluoride.

4. The method according to claim 2, wherein the second crude material is prepared by diproportionation of silane chloride selected from the group consisting of monochlorosilane, dichlorosilane, trichlorosilane, and silicon tetrachloride.

5. The method according to claim 1, wherein the crude material containing monosilane and ethylene is purified by fractional distillation including: (1) removing lightweight impurities having lower boiling points than monosilane, and (2) removing heavyweight impurities having higher boiling points than monosilane from the crude material purified in operation (1).

6. The method according to claim 5, wherein operation (1) is performed under conditions including a temperature of −50 to −20° C. and a pressure of 300 to 350 psig.

7. The method according to claim 5, wherein operation (2) is performed under conditions including a temperature of −40 to −30° C. and a pressure of 200 to 300 psig.

8. The method according to claim 1, wherein the removal of the ethylene and residual impurities is performed under conditions including a temperature of −80 to 100° C. and a pressure of −30 to 150 psig.

* * * * *